United States Patent

[11] 3,582,668

| [72] | Inventor | Yasutaka Kawase<br>Kyoto, Japan |
|---|---|---|
| [21] | Appl. No. | 827,559 |
| [22] | Filed | May 26, 1969 |
| [45] | Patented | June 1, 1971 |
| [73] | Assignee | Kawase Technical Research Co., Ltd.<br>Nagoya, Japan |
| [32] | Priority | May 27, 1968 |
| [33] | | Japan |
| [31] | | 43/35820 |

[54] ANTITHEFT DEVICE FOR MOTOR VEHICLES
12 Claims, 2 Drawing Figs.

[52] U.S. Cl. ............................................. 307/10,
340/52
[51] Int. Cl. ...................................................... H02g 3/00
[50] Field of Search .......................................... 307/10, 9;
340/64, 52 D; 180/114, 82.5

[56] References Cited
UNITED STATES PATENTS
2,695,676  11/1954  Wettengel ..................... 340/64X Primary Examiner—Robert K. Schaefer
Assistant Examiner—H. J. Hohauser
Attorney—Craig, Antonelli, Stewart & Hill ABSTRACT: Antitheft device for motor vehicles having a key switch connected in series between a power source an an ignition circuit, a remote-controlled switch connected in parallel with the key switch, a self-retaining relay which serves to retain the remote-controlled switch closed, a time switch provided in the circuit of the self-retaining relay to release said self-retaining relay after lapse of a specific time, and a relay network which energizes the said self-retaining relay when the said key switch is closed and said time switch is set concurrently.

PATENTED JUN 1 1971 3,582,668

INVENTOR

YASUTAKA KAWASE

BY Craig, Antonelli, Stewart & Hill

ATTORNEY

ANTITHEFT DEVICE FOR MOTOR VEHICLES

This invention relates to an antitheft device for motor vehicles.

A motor vehicle is liable to easy theft when it is left alone with its engine running, because the vehicle key is usually common to the ignition switch, the steering column and often to the doors, and therefore, the key has to be left in the ignition switch to keep the engine running. Consequently, its steering column and in some cases its doors cannot be locked with the engine running. Accordingly, it is a requirement that motor vehicles be parked with the engine off unless they are in guarded parking places. However, it is often necessary or desirable to leave a motor vehicle unattended with its engine running, for instance, in a cold weather when it takes several minutes to start and warm up the engine to a good condition while the driver and passengers wait indoors for this warming up of the engine, or in hot weather when the operation of an air conditioner takes a few minutes to sufficiently cool the vehicle passenger space. Therefore, there has been a demand for an antitheft device which enables drivers to leave their motor vehicles with the engines running without concern for the possibility of theft.

It is an object of the present invention to provide a new antitheft device for motor vehicles, which is capable of maintaining the engine in a running condition for a specific length of time after removal of the ignition key from the engine key switch.

It is another object of the present invention to provide a new antitheft device for motor vehicles, which is capable of holding the engine running for a desired preset length of time after removal of the ignition key from the engine key switch.

It is another object of the present invention to provide a new antitheft device for motor vehicles, which is capable of overriding the above-described control over the operations of the engine when means for selecting a driving position is actuated.

The antitheft device for motor vehicles of the present invention comprises: (a) a key switch is connected in series between a power source and an ignition circuit, and is closed when operated by inserting and turning a proper key in its keyhole, (b) a remote-controlled switch connected in parallel with the said key switch, (c) a self-retaining relay which, when energized, closes and thence retains the said remote-controlled switch closed, (d) a time switch which is provided in the circuit of the said self-retaining relay and releases the retaining of the said self-retaining relay by resetting its contacts after lapse of a specific time from the time of manually setting the said contacts, and (e) a relay network which energizes the said self-retaining relay when the said key switch is closed and concurrently the said time switch is set.

The present invention will be more fully understood by the following detailed description of specific embodiments thereof, made in conjunction with the attached drawings, wherein.

Figure 1:
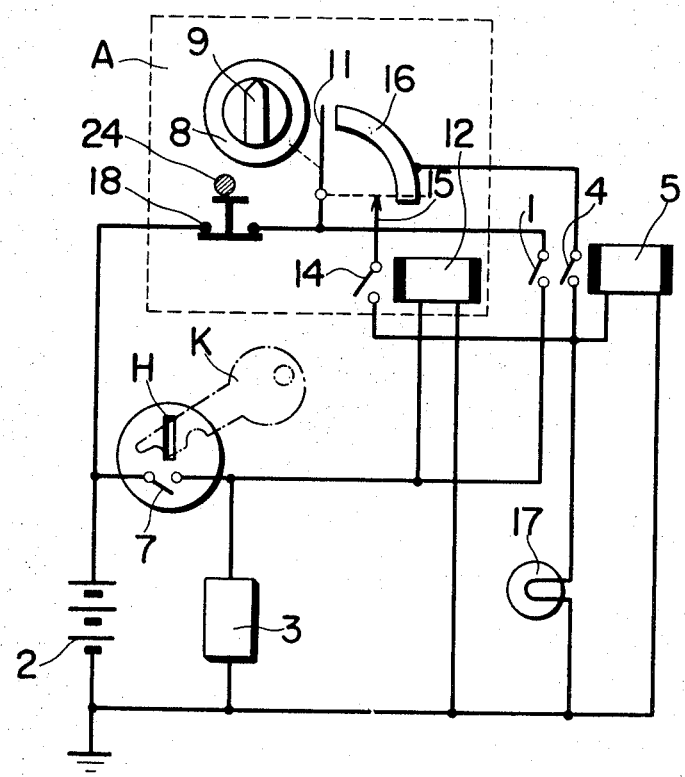
FIG. 1 is a circuit diagram of an embodiment.

Referring to FIG. 1, there is shown an embodiment of the present invention wherein an ignition circuit 3, for example of the type normally provided with internal combustion engines, is connected across terminals of a DC power source 2 through a key switch 7 which can be closed by means of a proper key inserted in its keyhole H. A series connection of a normally closed switch 18 and a remote-controlled switch 1 of a first relay 5 is connected in parallel with the key switch 7. A rotary contact 11, a quarter-circle contact 16, a holding contact 4 and the winding of first relay 5 are connected in series between the negative terminal of the DC power source 2 and the said switch 18. An indication lamp 17 is connected in parallel with the relay 5.

The winding of a second relay 12 is connected in parallel with the ignition circuit, and switch 14 of the relay 12 is connected in series between a starting contact 15 and the winding of said first relay 5. The rotary contact 11 is rotated counterclockwise by means of timer 8 having a setting knob 9. When the knob 9 is manually turned clockwise to its limit of rotation, the rotary contact 11 rotates clockwise and touches the starting contact 15 and quarter-circle contact 16, and afterwards, the rotary contact 11 starts to rotate counterclockwise detaching from the starting contact 15, and finally, after lapse of a specific set time, the rotary contact 11 disengages from the quarter-circle contact 16.

The motor vehicle provided with this antitheft device can be safely left unattended with its engine running for a specific time, by, firstly, switching the key switch 7 on by means of key K inserted in its keyhole H, secondly, turning the knob 9 of the timer 8 thereby making the rotary contact 11 touch the starting contact 15 and the quarter-circle contact 16, and thirdly, pulling out the key K from the keyhole H and locking the steering column and the doors with it.

The device functions to continue the engine running by the following operation:

As a consequence of closing the key switch 7, a current flows through a circuit connecting the positive terminal of the power source 2, the key switch 7, the ignition circuit 3 and the negative terminal of the power source 2, resulting in operation of the motor vehicle engine. At the same time, another current flows through a circuit connecting the positive terminal of the power source 2, the key switch 7, the winding of second relay 12 and negative terminal of the power source 2, resulting in an energizing of the relay 12 and thereby a closing of the switch 14. As a consequence of this closing of the switch 14 and the contacting of the rotary contact 11 to the starting contact 15 at a manual clockwise turning of the knob of the timer 8, a current flows through the circuit connecting the positive terminal of the power source 2, the switch 18, the rotary contact 11, the starting contact 15, the switch 14, the winding of first relay 5 and the negative terminal of the power source 2. The relay 5 is energized by means of the said current flowing through its winding, and consequently the switches 1 and 4 are closed. This closing of the switch 4 effects a holding of the relay 5 and thereby effects retaining of the switch 1 in closed state by permitting a current to flow through the circuit connecting the positive terminal of the power source 2, the switch 18, the rotary contact 11, the quarter-circle contact 16, the switch 4, the relay 5 and the negative terminal of the power source 2.

At a removal of the key K from the keyhole H, the key switch 7 opens and is kept so thereafter. In this state, the engine continues to run in conjunction with the continued operation of the ignition circuit motivated by the current flowing through the circuit connecting the positive terminal of the power source 2, the switch 18, the remote-controlled switch 1, ignition circuit 3 and the negative terminal of the power source 2; meanwhile, the switch 1 is retained closed by the said current flowing through the circuit connecting the positive terminal of the power source 2, the switch 18, the rotary contact 11, the quarter-circle contact 16, the switch 4, the relay 5 and the negative terminal of the power source 2. This retaining of the switch 1 and resultant running of the engine continue until the rotary contact 11 parts from the quarter-circle contact 16 at the lapse of the specific set time on the timer 8.

When the specific set time has lapsed and the rotary contact 11 parts from the quarter-circle contact 16, the relay 5 is reset in consequence of a break of the current flowing through it, resulting in breaking the current to the ignition circuit 3 and thereby preventing further operation of the engine.

The indication lamp 17 which is connected in parallel with the relay 5 indicates the energization of the relay 5, and therefore, the driver can easily know whether the specific set time is over or not, according to the off or on condition of this lamp.

Of course, the motor vehicle equipped with the antitheft device of this invention can be left alone with its engine off, by simply switching off the key switch and removing the key from the keyhole without actuating the timer 8.

The ceasing of the engine which started and is running in consequence of the above-mentioned handling of key switch 7 and the timer 8, during the specific set time, can easily be done after separation of the rotary contact 11 from the starting contact 15, by releasing the relay 5 by opening the normally closed switch 18.

The normally closed switch 18 may be mechanically linked to a means 24 for selecting the driving position, such as a driving position selecting lever of an automatic transmission system or a gear shift lever. For example, the switch 18 may be constituted to be closed only when the said gear shift lever takes the neutral position or when the said selecting lever of the automatic transmission system takes the parking position and the neutral position. By means of such a switch 18, the engine which is kept running by the above operation of the key switch 7 and the timer 8 stops as soon as the said gear shift lever or selecting lever is shifted to its driving position.

Figure 2:
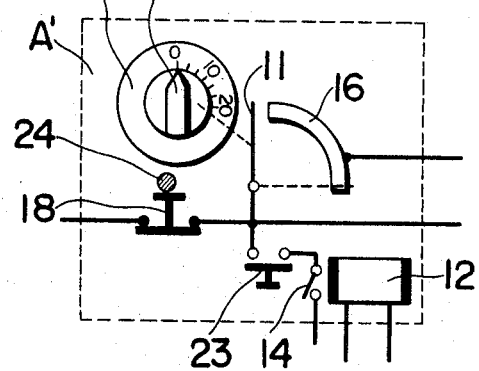
FIG. 2 is a circuit diagram of a part of another embodiment of the present invention.

FIG. 2 indicates a partial circuit A' which is a part of the second embodiment of this invention. The second embodiment is constituted by substituting the said partial circuit A' for the part A indicated by and enclosed in dotted lines in FIG. 1. In this embodiment, the starting contact 15 is omitted, and instead, a normally open switch 23, which is manually closed for a short time during the closing of the switch 7, is provided between the normally closed switch 18 and the switch 14. Other parts are constituted in the same manner as those of the first embodiment. The motor vehicle equipped with the device of this second embodiment can be safely parked with its engine running for a desired time, by, firstly, switching the key switch 7 on with key K inserted in its keyhole H, secondly, turning the knob 9 of the timer 8 to a desired position thereby setting the rotary contact 11 in a corresponding desired position on the quarter-circle contact 16 from which position the rotary contact starts to move to be reset to the original resting position, thirdly, closing the switch 23 for a short time manually or automatically as the constitution of the device may be, and fourthly, pulling out the key K from the keyhole H and locking the door with it. The closing of the said switch 23 functions to permit the current to flow through the relay 5 for a sufficient time to actuate it, and thereby completing the circuit connecting the positive terminal of the power source 2, the switch 18, the switch 23, the switch 14, the relay 5 and the negative terminal of the power source 2.

This second embodiment is capable of varying the engine-running time as the driver likes within the extent of capacity of the timer, in consequence of providing switch 23 which can be closed at any desired position of the rotary contact 11. The switch 23 may be preferably provided in relation to the knob 9 of the timer 8, for instance, so as to be closed by pushing the knob 9 at a desired setting point of the timer 8 or by a slight turning of the knob 9.

As is obvious from the above description, the engine of the motor vehicle provided with the antitheft device of the present invention can be started by a conventional starting operation, and can be retained in the running state for a specific time determined by the timer or for a desired preset time by the above-mentioned operation of the timer. Accordingly, the steering column and the door can be locked by the same key when the vehicle is left alone with its engine running. Furthermore, as the key K is not left in the keyhole H during the above running of the engine, there is no risk of the key K being stolen.

When the driver cannot come back to the vehicle in the preset time, the engine automatically stops when the preset time is over, avoiding waste of fuel as well as overheating of the engine due to idling for a long time. Moreover, by providing the switch 18 to release the holding of the relay 5 in accordance with the actuation of means for selecting a driving position, such as a selection lever of an automatic transmission system or a gear shift lever, the vehicle can be protected from being stolen by automatically stopping its engine by means of actuation of the selecting lever.

I claim:

1. An antitheft device for motor vehicles having a power source and an ignition circuit comprising:
    a key switch connected in series between said power source and said ignition circuit for applying power to said ignition circuit upon closing said key switch,
    a remote-controlled switch connected in parallel with said key switch,
    a self-retaining relay for operating said remote-controlled switch and having a holding circuit for holding the said remote-controlled switch closed,
    a time switch connected to the holding circuit of said self-retaining relay and said power source for holding said self-retaining relay closed only for a specific time from the time of manual setting thereof, and a relay network for connecting said self-retaining relay to said power source when the said key switch is closed and concurrently the said time switch is set.

2. An antitheft device for motor vehicles as defined in claim 1, further including a normally closed switch which, when opened, releases the holding circuit of the said self-retaining relay provided in series between said power source and the holding circuit of the said self-retaining relay.

3. An antitheft device for motor vehicles as defined in claim 2, wherein the normally closed switch is coupled with means for selecting the driving position in a transmission system of the vehicle.

4. An antitheft device for motor vehicles as defined in claim 1, wherein said relay network comprises a normally open starting switch connected in a circuit in parallel to the holding circuit of the said self-retaining relay, which starting switch is manually closed at a desired setting point of the timer.

5. An antitheft device for motor vehicles as defined in claim 2, wherein said relay network comprises a normally open manual starting switch connected in a circuit in parallel to said holding circuit of the said self-retaining relay.

6. An antitheft device for motor vehicles as defined in claim 3, wherein said relay network comprises a normally open manual starting switch connected in a circuit in parallel to said holding circuit of the said self-retaining relay.

7. An antitheft device for motor vehicles having a power source and an ignition circuit comprising:
    a key switch connected in series between said power source and said ignition circuit for applying power to said ignition circuit upon closing said key switch,
    a self-retaining relay having a switch closeable upon operation of said relay connected in parallel with said key switch and a holding circuit for maintaining operation of said relay once operated,
    a time switch connected in series between said holding circuit and said power source for disconnecting said holding circuit after a predetermined time, and
    control means for operating said self-retaining relay in response to closing of said time switch concurrently with closing of said key switch.

8. An antitheft device for motor vehicles as defined in claim 7, further including an override switch connected in series with said time switch, said holding circuit and said power source.

9. An antitheft device for motor vehicles as defined in claim 8, wherein said override switch is linked to a mechanical operating member of the vehicle so as to be opened upon operation of said member.

10. An antitheft device for motor vehicles as defined in claim 7, wherein said holding circuit includes a holding switch closeable upon operation of said self-retaining relay in series with an actuating winding of said relay.

11. An antitheft device for motor vehicles as defined in claim 10, wherein said control means includes a control relay having an actuating winding connected to said ignition circuit for energization therewith and a control switch closed upon energization of said actuating winding of the control relay selectively connected in parallel with the series combination of said holding circuit and said time switch.

12. An antitheft device for motor vehicles as defined in claim 11, wherein said time switch includes means for connecting said control switch to said power source only for a time sufficient to operate said self-retaining relay upon setting of said time switch.